US008467293B2

(12) United States Patent
Alicherry et al.

(10) Patent No.: US 8,467,293 B2
(45) Date of Patent: Jun. 18, 2013

(54) SINGLE-FAILURE PROTECTION IN A LOAD-BALANCED NETWORK ARCHITECTURE

(75) Inventors: Mansoor Ali Khan Alicherry, Scotch Plains, NJ (US); Harsha S. Nagesh, Berkeley Heights, NJ (US); Chitra A. Phadke, Basking Ridge, NJ (US); Viswanath Poosala, Middlesex, NJ (US)

(73) Assignee: Alcatel Lucent, Paris (FR)

( * ) Notice: Subject to any disclaimer, the term of this patent is extended or adjusted under 35 U.S.C. 154(b) by 2091 days.

(21) Appl. No.: 11/025,085

(22) Filed: Dec. 29, 2004

(65) Prior Publication Data

US 2006/0140118 A1 Jun. 29, 2006

(51) Int. Cl.
G01R 31/08 (2006.01)

(52) U.S. Cl.
USPC .......................................... 370/235; 370/474

(58) Field of Classification Search
USPC ................. 370/229, 395.5, 395.51, 469, 476, 370/235, 474, 401; 398/1, 5, 7, 57
See application file for complete search history.

(56) References Cited

U.S. PATENT DOCUMENTS

| | | | | | |
|---|---|---|---|---|---|
| 4,974,224 | A | * | 11/1990 | Boone | 370/400 |
| 6,233,075 | B1 | * | 5/2001 | Chang et al. | 398/79 |
| 6,243,846 | B1 | * | 6/2001 | Schuster et al. | 714/776 |
| 6,987,739 | B2 | * | 1/2006 | Kitazawa et al. | 370/252 |
| 7,142,564 | B1 | * | 11/2006 | Parruck et al. | 370/474 |
| 7,283,741 | B2 | * | 10/2007 | Sadananda | 398/5 |
| 7,373,543 | B1 | * | 5/2008 | Jain et al. | 714/4 |
| 2003/0002502 | A1 | * | 1/2003 | Gibson et al. | 370/389 |
| 2003/0063611 | A1 | * | 4/2003 | Schaub et al. | 370/395.32 |
| 2003/0117678 | A1 | * | 6/2003 | Chang et al. | 359/157 |
| 2003/0227877 | A1 | * | 12/2003 | Kar et al. | 370/252 |
| 2006/0133430 | A1 | * | 6/2006 | Nagesh et al. | 370/536 |

OTHER PUBLICATIONS

J. Edmonds and R.M. Karp, "Theoretical Improvements in Algorithmic Efficiency for Network Flow Problems," Journal of ACM, vol. 19, No. 2, 1990.
I. Keslassy et al., "Maintaining Packet Order in Two-Stage Switches," Proceedings of IEEE Infocom, 10 pages, New York, 2002.
E. Blanton et al., "On Making TCP More Robust to Packet Reordering," pp. 1-11, Jul. 24, 2001.
S. Iyer et al., "Making Parallel Packet Switches Practical," Proceedings of IEEE Infocom, 8 pages, 2001.
C-S. Chang et al., "Load Balanced Birkhoff-Von Neumann Switches, Part II: Multi-Stage Buffering," pp. 1-23, Aug. 29, 2001.
S. Keshav et al., "Issues and Trends in Router Design," IEEE Communication Magazine, 15 pages, 1998.

(Continued)

*Primary Examiner* — David Oveissi
(74) *Attorney, Agent, or Firm* — Ryan, Mason & Lewis, LLP

(57) ABSTRACT

Techniques for single-failure protection in load-balanced network architectures are disclosed. For example, in one aspect of the invention, a technique for processing a traffic flow in a communication network comprising a plurality of nodes, the traffic flow being deliverable from a source node to at least one destination node via one or more intermediate nodes, comprises the following steps/operations. The traffic flow is split at the source node into a plurality of parts. The parts are distributed to respective ones of the intermediate nodes such that the parts are routed from the source node to the at least one destination node in a disjoint manner.

20 Claims, 5 Drawing Sheets

OTHER PUBLICATIONS

C-S. Chang et al., "Load Balanced Birkhoff-von Neumann Switches, Part 1: One-stage Buffering," Computer Communications, pp. 1-25, 2001.

L.G. Valiant, "A Scheme for Fast Parallel Communication," SIAM Journal of Computing, vol. 11, No. 2, pp. 350-361, 1982.

ITU-T Recommendation G.7042/Y.1305—Corrigendum 1, "Link Capacity Adjustment Scheme (LCAS) for Virtual Concatenated Signals," 16 pages, 2002.

ITU-T Recommendation G.7042/Y.1305, "Link Capacity Adjustment Scheme (LCAS) for Virtual Concatenated Signals," 24 pages, 2001.

ITU-T Recommendation G.707/Y.1322, "Network Node Interface for the Synchronous Digital Hierarchy," 184 pages, 2000.

U.S. Appl. No. 10/785,352, filed Dec. 21, 2004, H.S. Nagesh et al.

U.S. Appl. No. 11/018,282, filed Feb. 24, 2004, H.S. Nagesh et al.

* cited by examiner

SINGLE-FAILURE PROTECTION IN A LOAD-BALANCED NETWORK ARCHITECTURE

RELATED APPLICATION

The subject matter of the present application is related to that of U.S. patent application Ser. No. 10/785,352, filed Feb. 24, 2004 in the name of inventors Harsha S. Nagesh et al. and entitled "Load Balancing Method and Apparatus for Ethernet Over SONET and Other Types of Networks," which is incorporated by reference herein.

FIELD OF THE INVENTION

The present invention relates generally to the field of data communication networks, and more particularly to load balancing techniques with single-failure protection for use in such networks.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

Despite the improvements associated with the recently-developed VC and LCAS protocols, there remain problems in both circuit-switched and packet-switched network architectures. Generally, existing architectures can be difficult to scale so as to accommodate large mesh topologies, and can still suffer from bandwidth efficiency or switching complexity concerns. For example, an architecture comprising an IP overlay over SONET may require an excessive amount of link bandwidth, while a pure IP network architecture will typically require a large amount of packet switching capacity at each network node.

The above-cited U.S. patent application Ser. No. 10/785,352 discloses an improved network architecture that can provide bandwidth efficiency without requiring high packet switching capacities at each node. In an illustrative embodiment of this load-balanced network architecture, there are N participating network nodes. An incoming packet flow of rate R at a given one of the nodes is split into N substantially equal parts, each having a rate of R/N. The packet flow is split into the N parts in a manner independent of the particular destination node or nodes that may be associated with that flow. The N parts of the incoming packet flow are distributed to respective ones of the N participating nodes, such that each of the N participating nodes receives a corresponding one of the N parts. Pre-provisioned circuits, each configured to support a rate of R/N, are used to distribute the parts to the various participating nodes. At least a subset of the participating nodes then route their respective parts to the one or more specified destination nodes. This illustrative embodiment thus routes individual parts of the given traffic flow over respective two-hop paths from a source node to a destination node via intermediate nodes. By avoiding the need for high packet switching capacities at each node, this load-balanced architecture facilitates the implementation of large-scale networks for EoS data traffic or other types of traffic flows.

An important issue that may arise in the context of load-balanced architectures such as that described in the above-cited U.S. patent application Ser. No. 10/785,352 relates to single-failure protection. More specifically, in the above-described load balancing architecture, packets of a flow at a given node are load balanced over different paths, each path flowing through an intermediate routing node to the destination. This behavior leads to secure transmission as no single intermediate node has access to the complete traffic. However, since each traffic flow is split over several paths, a single failure leads to the partial disruption of many more flows than in traditional networks. Hence, such a load balancing architecture can be susceptible to sabotage. Incoming traffic being load balanced over several individual flows increases the probability of large-scale traffic disruption with a single network fault.

It is therefore apparent that improved techniques are needed for dealing with the issue of single-failure protection in load-balanced network architectures.

SUMMARY OF THE INVENTION

The present invention meets the above-noted need by providing techniques for single-failure protection in load-balanced network architectures.

For example, in one aspect of the invention, a technique for processing a traffic flow in a communication network comprising a plurality of nodes, the traffic flow being deliverable from a source node to at least one destination node via one or more intermediate nodes, comprises the following steps/operations. The traffic flow is split at the source node into a plurality of parts. The parts are distributed to respective ones of the intermediate nodes such that the parts are routed from the source node to the at least one destination node in a disjoint manner.

The distributing step/operation may further comprise determining one or more disjoint paths from the source node to at least a portion of the intermediate nodes, and determining one or more disjoint paths from at least a portion of the intermediate nodes to the at least one destination node. In an illustrative embodiment, at most, two parts of the traffic flow are distributed on any given link of the network. Further, the routing technique may comprise introducing two parity packets for every k−2 packets of traffic at the source node, where k is the total number of packets to be split.

Advantageously, the invention routes these split flows from the source to destination in a node and link disjoint manner, such that a single network fault (link or node failure) does not affect the complete traffic between any source-destination node pair.

These and other objects, features and advantages of the present invention will become apparent from the following detailed description of illustrative embodiments thereof, which is to be read in connection with the accompanying drawings.

DETAILED DESCRIPTION OF THE INVENTION

Figure 1:
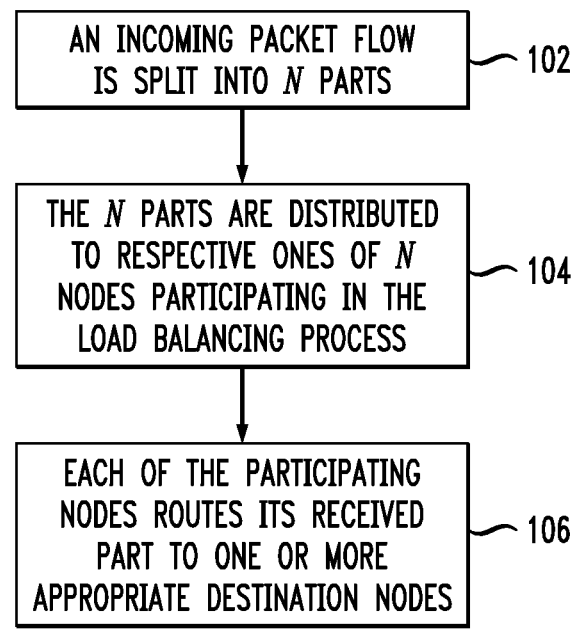
FIG. 1 is a flow diagram of a load balancing process in an illustrative embodiment of the invention.

The invention will be illustrated herein in conjunction with an illustrative embodiment which utilizes a load-balanced network architecture of the type described in the above-cited U.S. patent Ser. No. 10/785,352. It is to be appreciated, however, that the invention is not limited to the particular network architecture and associated load balancing process of the illustrative embodiment, but is more generally applicable to any network application in which it is desired to provide improved failure protection.

For example, although well suited for use with EoS data traffic, with or without virtual concatenation, the invention can be used with any type of traffic flow.

Before describing principles of the single-failure protection techniques of the invention, details of the illustrative load balancing process will first be described in the context of FIGS. 1 through 3.

Referring now to the flow diagram of FIG. 1, a load balancing process in an illustrative embodiment of the invention will be described. The process in this example includes steps 102, 104 and 106. It will be assumed for purposes of simplicity and clarity of illustration that the network comprises N nodes, each of which needs to support an ingress and egress traffic rate of R. The variable N is an arbitrary number that can take on any desired value consistent with the practical constraints of a given implementation.

In step 102, an incoming packet flow of rate R at a given network node is split into a plurality of parts, more specifically denoted as N parts. The incoming packet flow of rate R is split into its N parts in a manner that is independent of the particular destination node or nodes that may be associated with that packet flow.

In step 104, the N parts of the incoming packet flow are distributed to respective ones of N nodes participating in the load balancing process. Thus, each of the N participating nodes in this example receives a corresponding one of the N parts. The distribution of the parts to the various participating nodes, other than the given node at which the flow splitting occurs, preferably takes place over pre-provisioned circuits each configured to support a rate of R/N. Each of the pre-provisioned circuits is thus able to transport one of the N parts of the split packet flow.

The participating nodes to which parts of a split packet flow are distributed are also referred to herein as "intermediate" nodes. Certain of these intermediate nodes may also correspond to destination nodes, which may be final destination nodes. Also, a given node may be a source or destination node for one flow, and an intermediate node for one or more other flows.

In step 106, each of the participating nodes routes its received part to one or more appropriate destination nodes.

The splitting of a given flow may be a substantially equal split, which involves splitting the flow into a plurality of equal or substantially equal parts, as in the above-noted situation in which each of N parts of a rate-R flow has a rate of R/N, or may be a non-equal split, which involves splitting the flow into a number of non-equal parts. Various combinations of equal and non-equal flow splitting may be used, and different nodes in the network may utilize different types of flow splitting.

In addition, the flow splitting may be performed at a packet level, independent of the final destination node of the packet, so as to facilitate the handling of variable-length packets. Other types of flow splitting may be used.

A more particular example of the load balancing process of FIG. 1 will now be described in conjunction with the network architecture shown in FIGS. 2A and 2B.

Figure 2A:
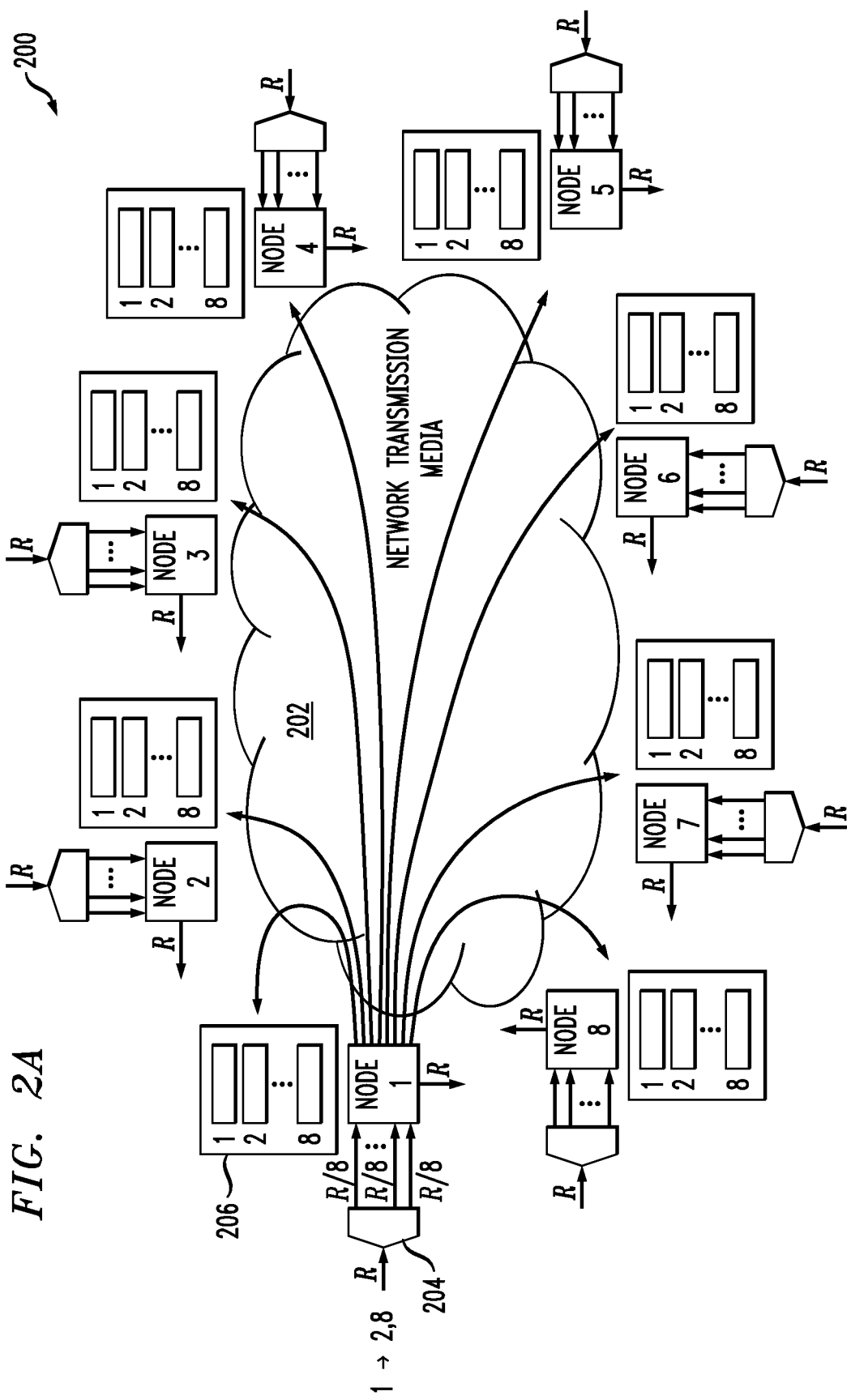
FIGS. 2A and 2B show views of an example network architecture implementing a load balancing process of the type described in conjunction with FIG. 1.

Referring initially to FIG. 2A, an example network 200 is shown. The network 200 comprises eight nodes, generally denoted 1, 2, . . . 8, which are configured to communicate over network transmission media 202. Each of the nodes is assumed to support an ingress and egress traffic rate of R, as in the previous example. Associated with each of the nodes is at least one corresponding flow splitter 204 and a corresponding set of virtual output queues (VOQs) 206. A given one of the sets of VOQs includes a separate queue for each of the eight nodes. Although the flow splitters 204 and VOQ sets 206 are shown as being separate from their corresponding nodes 1, 2, . . . 8, this is for purposes of simplicity and clarity of illustration, and each node 1, 2, . . . 8 may be implemented so as to incorporate therein its associated flow splitter 204 and VOQ set 206. A node of this type will be described in greater detail below in conjunction with FIG. 3. Numerous other node implementations are possible.

The output queues of the illustrative embodiment are referred to as "virtual" in order to emphasize that physically separate queues are not required, and that other techniques may be used to associate particular portions of a memory space with different destination nodes. However, the invention can be implemented using non-virtual queuing arrangements, in which physically separate queues are provided for different destination nodes. The term "queue" as used herein should be construed generally, so as to encompass either a virtual or non-virtual queue, or combinations of multiple such queues.

In operation, an incoming packet flow arrives at node 1, to be routed to destination nodes 2 and 8. The incoming rate-R packet flow at node 1 is split via the associated flow splitter into eight substantially equal-rate parts of rate R/8.

The flow splitting may be achieved, by way of example, by maintaining N queues at each of the nodes and filling the queues utilizing a round-robin technique, shortest queue first technique or other type of queue-filling technique. Such queues and corresponding control logic may be implemented in a node memory or as a separate device coupled to or otherwise associated with a given node. It is also possible to utilize the above-noted VC and LCAS protocols, or other virtual concatenation techniques or straightforward modifications thereof, to implement the desired flow splitting. It should be noted that use of certain conventional virtual concatenation techniques would provide flow splitting at a byte level, and thus may not be directly utilizable in the illustrative embodiment without suitable modification to ensure that the desired packet format is maintained after splitting of the flow.

Subsequent to the flow split, the various parts of the flow are distributed to respective ones of the participating nodes. In this example, the eight parts, each of rate R/8, are distributed to respective ones of the eight nodes, as shown in FIG. 2A. Thus, one of the parts remains at node 1, although it may be viewed as being "distributed" to that node, as this term is intended to be construed generally herein. The distribution of the various parts to nodes 2 through 8 is preferably implemented using pre-provisioned circuits of rate R/8, although other types of distribution may be used. The pre-provisioning of circuits for distributing the various parts of a split flow may be implemented using conventional techniques of a type well known to those skilled in the art, and advantageously avoids the need for real-time circuit setup responsive to changing traffic patterns.

Once each of the parts has been distributed to its corresponding intermediate node, the parts are routed to the appropriate destination node or nodes. In this example, the destination nodes of the incoming packet flow are nodes 2 and 8.

Figure 2B:
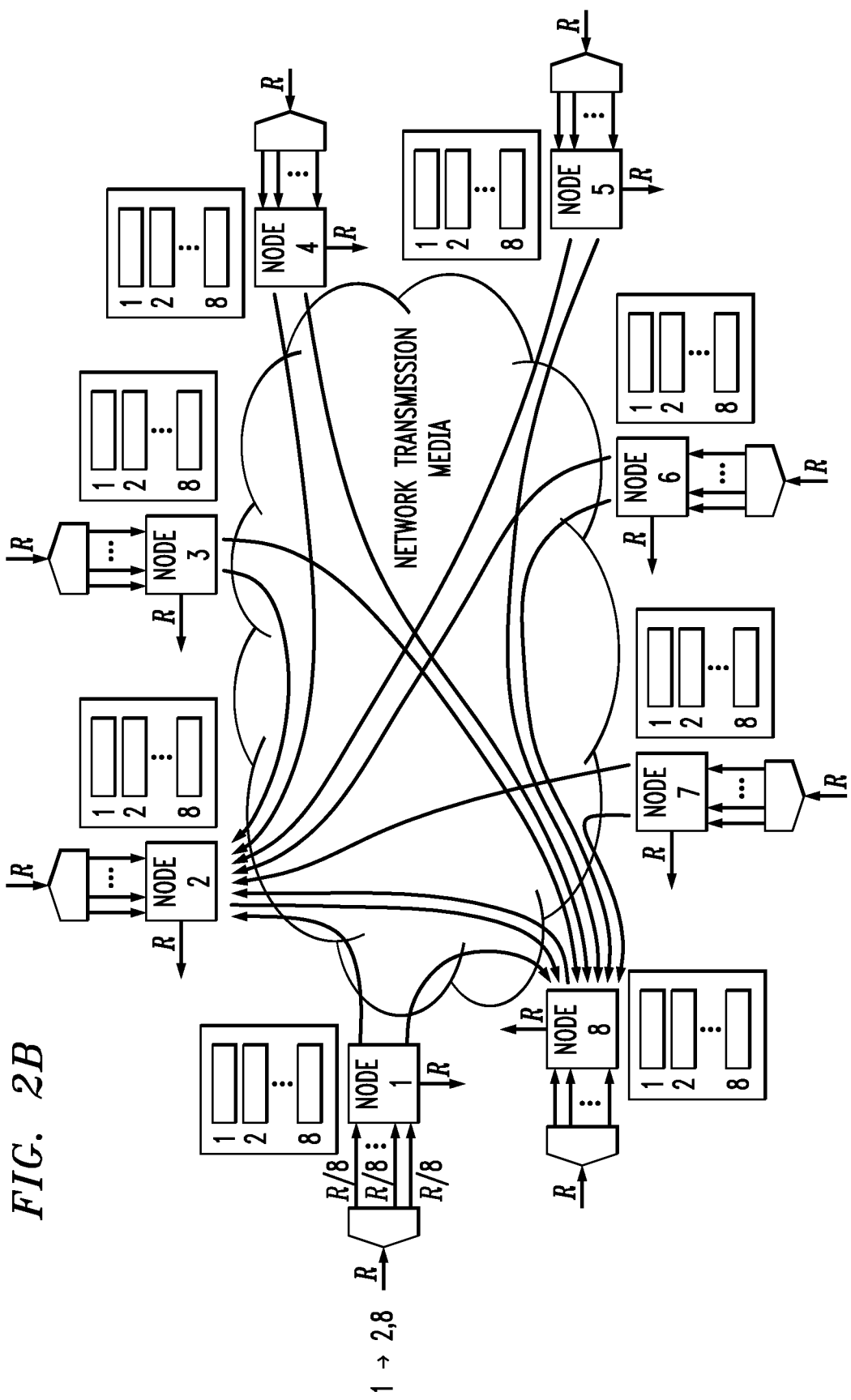

FIG. 2B shows the routing of the packets from the sets of VOQs to the appropriate destination nodes 2 and 8. This routing process, as illustrated in FIG. 2B, generally involves each intermediate node examining destination addresses in packet headers of its received part, and storing the packets in appropriate resequencing buffers or VOQs, based on the destination addresses. As noted above, a given one of the sets of VOQs includes a separate queue for each of the eight nodes in this example. Since the destination nodes of the split flow are nodes 2 and 8, the VOQs corresponding to nodes 2 and 8 will store the packets of the various parts, based on packet header destination address.

It should be noted that those packets distributed to node 2 that have a final destination of node 2 are not enqueued in the corresponding VOQ, but are instead stored in a resequencing buffer of node 2. Similarly, those packets distributed to node 8 that have a final destination of node 8 are not enqueued in the corresponding VOQ, but are instead stored in a resequencing buffer of node 8.

It is to be appreciated that the particular arrangements of network elements and processing steps shown in FIGS. 1, 2A and 2B are presented by way of illustrative example only, and should not be construed as limiting the scope of the invention in any way. As indicated previously, the invention can be implemented using a wide variety of other network configurations and traffic flow processing operations.

An advantage of the illustrative embodiment over conventional arrangements is that each of N network nodes participating in the load balancing process for a rate-R flow receives a total amount of traffic flow corresponding to N times R/N=R. Thus, the required switching capacity of each node is fixed based on rate, and is not a function of N, which allows the architecture to be readily scaled to accommodate large mesh topologies. By way of contrast, a pure IP architecture for a similar configuration would require a switching capacity on the order of (N−1)R at each of the nodes. Also, bandwidth efficiency is improved relative to the IP overlay over SONET architecture, which requires, for a general ring topology of N nodes with unidirectional routing, an aggregate link bandwidth on the order of $N^2(N-1)R/2$.

The illustrative embodiment thus provides bandwidth efficiency without requiring high packet switching capacities at each node. Other advantages include improved security, since each node receives only a 1/N portion of a given traffic flow. Also, since each packet is queued only once, the end-to-end delay in this architecture is bounded. Operationally, this architecture is well suited for service providers to gradually grow their networks in a phased manner, by including more nodes participating in the load balancing process.

Figure 3:
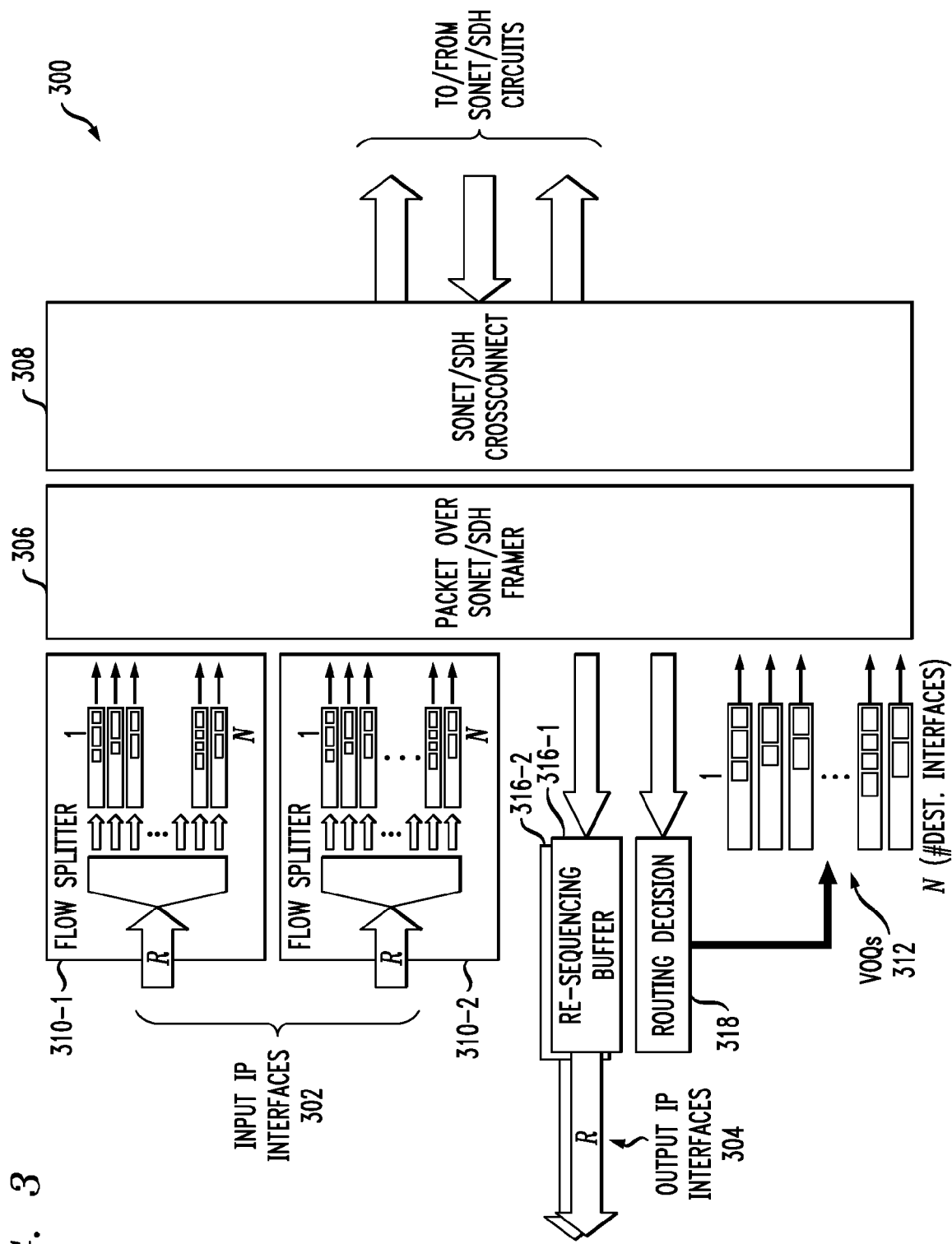
FIG. 3 shows an exemplary implementation of a network node suitable for implementing a load balancing process of the type described in conjunction with FIG. 1.

FIG. 3 shows an exemplary implementation of a particular one of the network nodes in a load-balanced network architecture in accordance with the invention. The node 300 may be viewed as representing, for example, one of the nodes 1, 2, . . . 8 in the network 200 previously described in conjunction with FIGS. 2A and 2B.

The node 300 includes multiple input IP interfaces 302 and multiple output IP interfaces 304, with each of the individual input or output interfaces being of rate R. Each of the input IP interfaces 302 has a flow splitter 310-1 or 310-2 associated therewith, and each of the output IP interfaces has a resequencing buffer 316-1 or 316-2 associated therewith. Although only two input IP interfaces and two output IP interfaces are shown, it should be understood that a given network node configured in accordance with the invention may include more or fewer interfaces, and the number of associated flow splitters or resequencing buffers would be adjusted accordingly.

Also included in the node 300 are a routing decision block 318 and a set of VOQs 312 arranged as shown. The set of VOQs 312 includes N separate queues, as was previously described in conjunction with FIGS. 2A and 2B, although other configurations may alternatively be used.

The node 300 further includes a number of SONET/SDH circuits, including a packet over SONET/SDH framer 306 and a SONET/SDH crossconnect 308, which communicate with one or more additional SONET/SDH circuits not explicitly shown. These and other SONET/SDH circuits utilizable in node 300 may be implemented in a conventional manner, and will not be further described herein. The term "SONET/SDH" as used herein is intended to include SONET only, SDH only, or combinations of SONET and SDH.

At each of the input interfaces 302, a traffic flow of rate R is split into N different parts, in the manner described previously, utilizing flow splitter 310-1 or 310-2. Each of the individual parts is then mapped onto a corresponding pre-provisioned SONET/SDH circuit. Any packets received by the node 300 are first examined to determine whether or not they have reached their final destination. If node 300 is the final destination for a given packet, that packet is placed in the appropriate re-sequencing buffer 316-1 or 316-2 such that packets are permitted to leave the node in the same order in which they entered the network. If node 300 is an intermediate node not corresponding to the final destination for the given packet, the packet is placed in the appropriate queue in the set of VOQs 312. From the VOQ, the packet is routed via the corresponding SONET/SDH circuit to its destination node.

The particular node implementation shown in FIG. 3 is intended as an example of one possible network node that may be used in implementing the load-balanced network architecture in the illustrative embodiment previously described. Other types of node configurations may be used, as will be appreciated by those skilled in the art, and a given network may include many nodes with differing configurations.

Generally, a node may be configured so as to include a processor coupled to a memory. The processor may comprise a microprocessor, a microcontroller, a central processing unit (CPU), an application-specific integrated circuit (ASIC) or other type of processing device, as well as portions or combinations of such devices. The memory may include an electronic random access memory (RAM), a read-only memory (ROM) or other type of storage device, as well as portions or combinations of such devices. The memory may be used to store software that is executed by or otherwise utilized by the processor in implementing at least a portion of a load balancing process in accordance with the invention.

With reference again to the node 300 of FIG. 3, elements such as flow splitters 310, VOQs 312, resequencing buffers 316, and routing decision block 318 may be viewed as one possible implementation of a processor and associated memory. For example, routing decision block 318 may be viewed as an element of a processor coupled to a memory comprising VOQs 312.

The node 300 may be viewed as an example of what is more generally referred to herein as a "processing device." Such a processing device may be implemented in the form of one or more integrated circuits, as well as in the form of other types of hardware, software or firmware, in any combination.

It is to be appreciated that the network 200 and node 300 are considerably simplified for purposes of illustration, and may include other elements, not explicitly shown, that are commonly found in conventional networks or nodes. For example, although the flow splitter element 206 implements the load balancing functionality in the illustrative embodiment, in other embodiments a separate load balancing element may be used.

As mentioned previously, an issue that may arise in the context of load-balanced architectures such as that described in conjunction with FIGS. 1 through 3 above relates to single-failure protection.

More particularly, in such a flow-splitting scheme, the loss of a single tributary flow (e.g., one of the N parts) leads to the partial disruption of many more flows than in traditional networks. Thus, the invention realizes that it would be desirable to route these tributary flows from the source to destination in a node and link disjoint manner, such that a single network fault (link or node failure) does not affect the complete traffic between any source-destination node pair. When two paths are said to be both "node disjoint" and "link disjoint" with respect to each other, this generally means that the two paths do not have any nodes or links in common, other than the source and destination nodes where the paths originate and terminate.

It is to be appreciated that routing techniques of the invention, to be described in detail below in the context of FIGS. 4 through 6, can be used to route one or more of the N parts of a split traffic flow, as described above in the context of the load-balanced architecture of FIGS. 1 through 3, such that single-failure protection is realized in the network. Thus, one or more of the nodes referred to below in the context of FIGS. 4 through 6 may be implemented as described in the context of the node implementation of FIG. 3.

Figure 4:
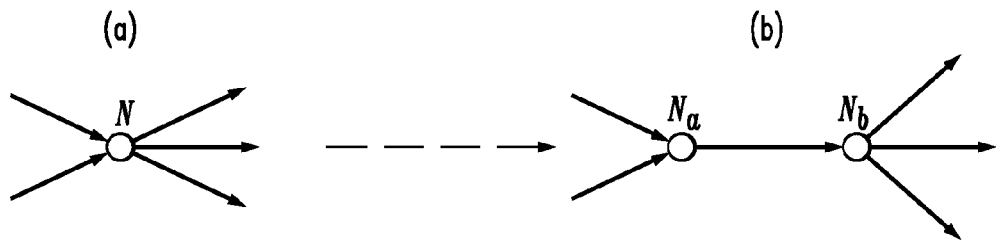
FIGS. 4A and 4B show diagrams of a graph transformation process for creating a node-disjoint path, in accordance with an illustrative embodiment of the invention.

An illustrative approach that may be used to solve a node disjoint path problem may include applying a transformation as shown in FIG. 4 to each node in the given graph. A node N is split into two split-nodes $N_a$ and $N_b$ such that all incident links on N are incident on $N_a$ and all links going out from N go out from $N_b$. A "pseudo-link" connects the two split nodes. A pseudo-link is a link we introduce into the graph as a construction used to solve the problem. It is not part of the original graph and will also not be part of the final solution. It is a mechanism of transforming the graph to make it amenable for the algorithms used to solve the problem. The algorithms used can solve for link disjoint paths. If we need the paths to be node disjoint also, then we convert the nodes to these "pseudo-links" in order to solve the problem. Thus, in the transformed graph, the node disjoint condition is translated into an edge disjoint constraint, such that no two tributary flows, split at the source node, flow on the same edge.

In a second step of this transformation, all links are assigned a flow capacity in the following manner. A flow of F units is routed from the source to destination such that each of the k tributaries, each of bandwidth F/k, passing through each of the k intermediate nodes, are routed in a disjoint manner. It is to be understood that "tributary" refers to each of the sub-flows obtained after flow splitting into N parts at the source node. A capacity of one unit is assigned to a link whose capacity is equal to or greater than F/k units; else a capacity of zero units is assigned. A capacity of one unit is assigned to all the pseudo-links created.

This transformation guarantees that only one tributary passes through any link and thus guarantees the disjoint paths from source to destination. Further, k units of flow are routed between the source and destination on the transformed network. A solution to this flow problem includes the paths taken by each unit of the flow, essentially of capacity F/k, which are the tributaries of flow.

However, this approach does not guarantee that each of the tributaries flow through the designated intermediate nodes. The optimal solution to such a flow problem with the constraint of intermediate nodes is known to be hard and, hence, the invention provides a heuristic to solve this problem. In addition to finding a path for each of the k tributaries between a given source-destination node pair, the routing design problem involves solving the same problem for all source-destination node pairs.

Consider, for example, traffic flows S1-D1 and S1-D2. Traffic at source S1 is first flow-split to the k intermediate nodes, independent of its final destination. In a manner explained previously, at each of the k intermediate nodes, traffic is routed into the appropriate virtual output queue to be finally routed to their final destinations. Thus, the first stage for either of the flows Si-Dk1 and Si-Dk2, where Dk1 and Dk2 are two destination nodes, share the same path from source Si to the k intermediate nodes.

Similarly, the second stage of the k tributary flows of traffic between Sk1-Dj and Sk2-Dj, from the k intermediate nodes to the destination Dj, share the same path. Thus, the routing design problem is solved in two stages: (1) find k disjoint paths, of bandwidth F/k, from each source participating in the load balancing scheme to the k intermediate nodes; and (2) find k disjoint paths, of bandwidth F/k, from each intermediate node to every destination participating in the load-balancing scheme.

Figure 5:
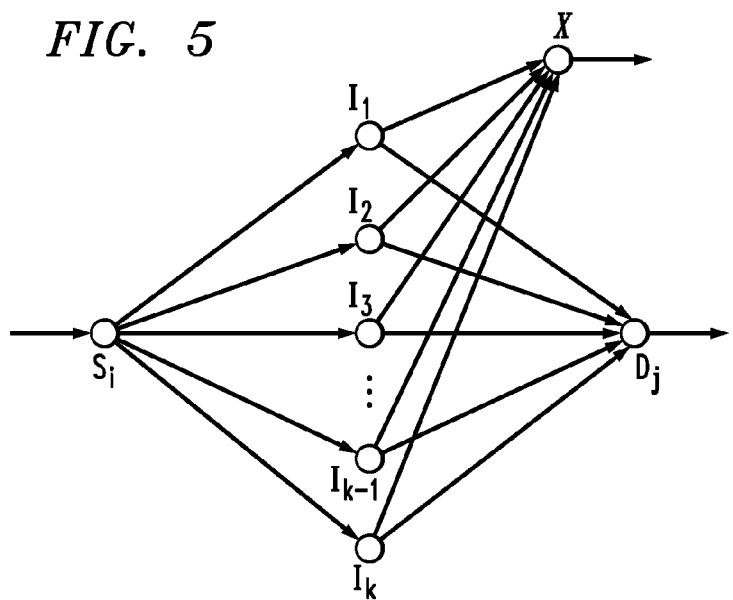
FIG. 5 show a diagram of a routing example of a transformed network for a first single-failure protection design stage, in accordance with an illustrative embodiment of the invention.

FIG. 5 represents the transformed network used to compute the disjoint paths from source $S_i$ to the k intermediate nodes ($I_l, \ldots, I_k$). A super node X is introduced connecting node X to each of the intermediate nodes directly with a pseudo-link of unit capacity. A flow of k units is routed between each source node $S_i$ and the super node X A solution to this flow problem on the transformed network yields k disjoint paths from every source to the k intermediate nodes required for the first stage of the illustrative load-balanced architecture. The link capacities in this transformed network are set as previously explained.

It is to be understood that to solve the max flow problem, we need a single source and a single destination. To find disjoint paths between the source and the k intermediate nodes, we need to make it suitable to use the max-flow algorithm. To do that, we connect all the intermediate nodes to a super node X and solve the max flow problem between the source node and the super node X. Examples of maximum flow algorithms that can be used in accordance with the invention are described in L. R. Ford, Jr., "Flows in Network," Princeton University Press, 1962, and J. Edmonds and R. M. Karp, "Theoretical Improvements in Algorithmic Efficiency for Network Flow Problems," Journal of ACM, Vol. 19, No. 2, 1990, both of which are incorporated by reference herein.

Figure 6:
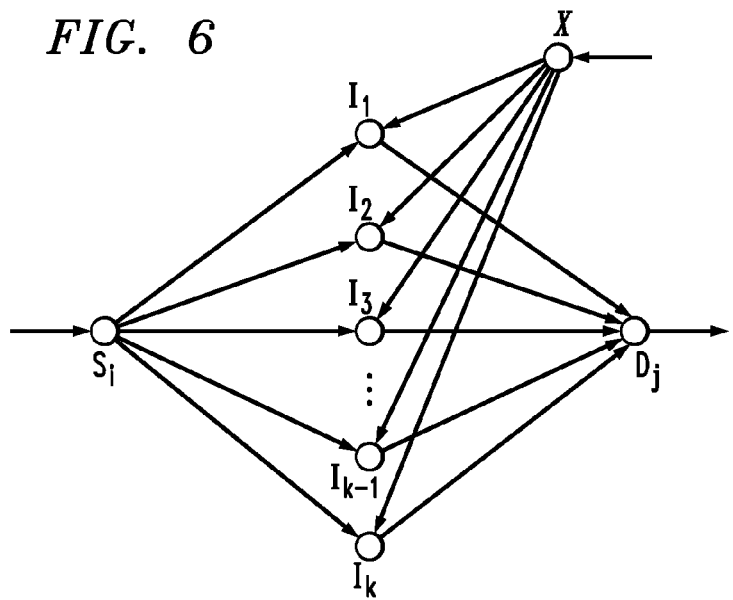
FIG. 6 show a diagram of a routing example of a transformed network for a second single-failure protection design stage, in accordance with an illustrative embodiment of the invention.

Similarly, FIG. 6 represents the transformed network used to design the k disjoint paths for the second stage. A flow of k units is routed between the super node X and every destination node participating in the load-balancing scheme. A solution to this flow problem on the transformed network yields k disjoint paths from the k intermediate nodes to every destination node.

The above-described routing methodologies guarantee that the flow-split tributaries at each source node are routed disjoint to the intermediate nodes. Further, they also guarantee that the traffic flow between the same source-destination node pair is routed in a link disjoint manner from the intermediate nodes to the final destination.

Since the first and second stages have been designed independently, it is possible that one or more of the disjoint paths of the second stage may have one or more links common with the disjoint paths of the first stage. However, it is guaranteed that on any given link of the network, at most, two distinct tributary flows of bandwidth F/k would flow, i.e., two different flow tributaries, one of the first stage and one of the second stage or two flows of the same tributary belonging to the two stages.

A single link failure can thus lead to the loss of, at most, two tributaries. Further, a single node failure is guaranteed to result in the loss of only a single tributary, due to the nature of the graph transformation that converts the node disjoint problem to a link disjoint problem. Thus, to sustain a single network failure, the loss of any two tributary flows of the end-to-end traffic flow between any source-destination node pair should be recovered.

Furthermore, two parity packets may be introduced for every k−2 packets of traffic at the source and split the resulting new traffic of k packets k ways over the k disjoint paths. This guarantees that the designed network can handle any single network failure and still provide the benefits of security.

Parity packet is a standard technique for error correction. Basically, if there is one parity bit for n−1 bits of information, then given any n−1 of these bits, we can compute the information that is lost. If the single bit that is lost is the parity bit, itself, then there is nothing to be done. If it is any information bit that is lost, then a bit-wise XOR (exclusive logical OR) operation can help recover the lost bit. Similarly, for a potential loss of two bits of information, we would need two parity bits to be able to fully recover lost information. Thus, since we have a possibility of losing two packets, we are using two parity packets in our solution.

It is to be appreciated that one or more of the methodologies of the invention may be used in conjunction with one or more of the methodologies disclosed in U.S. patent application Ser. No. 11/018,282, filed Dec. 21, 2004 in the name of inventors Harsha S. Nagesh et al. and entitled "Packet Reorder Resolution in a Load-balanced Network Architecture," which is incorporated by reference herein. In this cited application, methodologies are disclosed for resolving out-of-order packet arrival at the destination. Solutions to that problem recommend that the traffic at a source be load balanced on a per flow basis to have an upper bound for the out-of-order resolution buffers at the destination. Thus, parity packets are introduced on a per-flow basis, belonging to the total traffic at a source node. Further, since packets are of variable length, parity packets would always be packets of maximal length allowed by Transmission Control Protocol (TCP), e.g., 1500 bytes.

Again, it should be emphasized that the above-described embodiments of the invention are intended to be illustrative only. For example, the particular steps of the load balancing process of FIG. 1, and the node and network configurations of FIGS. 2 through 6, may be varied in alternative embodiments. Also, other types of virtual or non-virtual queuing arrangements may be used. Furthermore, the invention may be applied to any routing application, without regard to the type, arrangement or configuration of the network, network nodes, or communication protocols. These and numerous other alternative embodiments within the scope of the following claims will be readily apparent to those skilled in the art.

We claim:

1. A method of processing a traffic flow in a communication network comprising a plurality of nodes, the traffic flow being deliverable from a source node to at least one destination node via one or more intermediate routing nodes, the method comprising the steps of:

splitting the traffic flow at the source node into a plurality of N parts; and distributing the N parts such that the N parts are first routed from the source node to respective ones of N intermediate routing nodes in a disjoint manner and then subsequently routed from the respective ones of the N intermediate routing nodes to the at least one destination node in a disjoint manner, such that no two paths between the source node and the at least one destination node have any nodes or links in common to prevent a single link failure or a single node failure from affecting the complete traffic flow between any source-destination node pair, wherein a first routing step of the distributing step comprises finding a first set of disjoint paths from the source node to the respective ones of the N intermediate routing nodes, and wherein a subsequent routing step of the distributing step comprises finding a second set of disjoint paths from each of the respective ones of the N intermediate routing nodes to the at least one destination node.

2. The method of claim 1, wherein the distributing step further comprises the step of determining one or more disjoint paths from the source node to at least a portion of the N intermediate routing nodes.

3. The method of claim 1, wherein the distributing step further comprises the step of determining one or more disjoint paths from at least a portion of the N intermediate routing nodes to the at least one destination node.

4. The method of claim 1, wherein the subsequent routing step is performed by the respective ones of the N intermediate routing nodes.

5. A method of processing a traffic flow in a communication network comprising a plurality of nodes, the traffic flow being deliverable from a source node to at least one destination node via one or more intermediate routing nodes, the method comprising the steps of:
    splitting the traffic flow at the source node into a plurality of N parts; and
    distributing the N parts to respective ones of N intermediate routing nodes such that the N parts are routed from the source node to the at least one destination node in a disjoint manner such that no two paths between the source node and the at least one destination node have any nodes or links in common to prevent a single link failure or a single node failure from affecting the complete traffic flow between any source-destination node pair;
    wherein the distributing step further comprises the step of distributing, at most, two parts of the traffic flow on any given link of the network.

6. The method of claim 1, wherein distributing step further comprises distributing the N parts of the traffic flow to the respective ones of the N intermediate routing nodes over pre-provisioned circuits each configured to support a corresponding one of the N parts.

7. The method of claim 1, wherein each of the N parts follows one of N different paths from the source node to the destination node via a corresponding one of the N intermediate routing nodes.

8. A method of processing a traffic flow in a communication network comprising a plurality of nodes, the traffic flow being deliverable from a source node to at least one destination node via one or more intermediate routing nodes, the method comprising the steps of:
    introducing two parity packets for every k–2 packets of traffic at the source node, where k is the total number of packets;
    splitting the traffic flow with the parity packets at the source node into a plurality of k parts; and
    distributing the k parts to respective ones of the intermediate routing nodes such that the k parts are routed from the source node to the at least one destination node in a disjoint manner where no two paths between the source node and the at least one destination node have any nodes or links in common to prevent a single link failure or a single node failure from affecting the complete traffic flow between any source-destination node pair.

9. Apparatus for use in processing a traffic flow in a communication network comprising a plurality of nodes, the traffic flow being deliverable from a source node to at least one destination node via one or more intermediate routing nodes, the apparatus comprising:
    a memory; and
    a processor coupled to the memory, the processor being operative to split the traffic flow into a plurality of N parts, and distribute the N parts such that the N parts are first routed from the source node to respective ones of N intermediate routing nodes in a disjoint manner and then subsequently routed from the respective ones of the N intermediate routing nodes to the at least one destination node in a disjoint manner such that no two paths between the source node and the at least one destination node have any nodes or links in common to prevent a single link failure or a single node failure from affecting the complete traffic flow between any source-destination node pair,
    wherein a first routing step of the distributing step comprises finding a first set of disjoint paths from the source node to the respective ones of the N intermediate routing nodes, and
    wherein a subsequent routing step of the distributing step comprises finding a second set of disjoint paths from each of the respective ones of the N intermediate routing nodes to the at least one destination node.

10. The apparatus of claim 9, wherein the distributing operation further comprises determining one or more disjoint paths from the source node to at least a portion of the N intermediate routing nodes.

11. The apparatus of claim 9, wherein the distributing operation further comprises determining one or more disjoint paths from at least a portion of the N intermediate routing nodes to the at least one destination node.

12. Apparatus for use in processing a traffic flow in a communication network comprising a plurality of nodes, the traffic flow being deliverable from a source node to at least one destination node via one or more intermediate routing nodes, the apparatus comprising:
    a memory; and
    a processor coupled to a memory, the processor being operative to split the traffic flow into a plurality of N parts, and to distribute the N parts to respective ones of a plurality of N intermediate routing nodes such that the parts are routed from the source node to the at least one destination node in a disjoint manner such that no two paths between the source node and the at least one destination node have any nodes or links in common to prevent a single link failure or a single node failure from affecting the complete traffic flow between any source-destination node pair;
    wherein the distributing operation further comprises distributing, at most, two parts of the traffic flow on any given link of the network.

13. The apparatus of claim 9, wherein distributing operation further comprises distributing the N parts of the traffic flow to the respective ones of the N intermediate routing nodes over pre-provisioned circuits each configured to support a corresponding one of the N parts.

14. The apparatus of claim 9, wherein each of the N parts follows one of N different paths from the source node to the destination node via a corresponding one of the N intermediate routing nodes.

15. Apparatus for use in processing a traffic flow in a communication network comprising a plurality of nodes, the traffic flow being deliverable from a source node to at least one destination node via one or more intermediate routing nodes, the apparatus comprising:
    a memory; and
    a processor coupled to a memory, the processor being operative to: introduce two parity packets for every k–2 packets of traffic in the traffic flow at the source node, where k is the total number of packets; split the traffic flow with the parity packets into a plurality of k parts, and to distribute the k parts to respective ones of a plurality of intermediate routing nodes such that the k parts are routed from the source node to the at least one destination node in a disjoint manner where no two paths between the source node and the at least one destination node have any nodes or links in common to prevent a single link failure or a single node failure from affecting the complete traffic flow between any source-destination node pair.

16. An article of manufacture storing one or more programs for use in processing a traffic flow in a communication network comprising a plurality of nodes, the traffic flow being deliverable from a source node to at least one destination node via one or more intermediate routing nodes, the one or more programs when executed in a processor implementing a method comprising the steps of:

splitting the traffic flow at the source node into a plurality of N parts; and distributing the N parts such that the N parts are first routed from the source node to respective ones of N intermediate routing nodes in a disjoint manner and then subsequently routed from the respective ones of the N intermediate routing nodes to the at least one destination node in a disjoint manner such that no two paths between the source node and the at least one destination node have any nodes or links in common to prevent a single link failure or a single node failure from affecting the complete traffic flow between any source-destination node pair, wherein a first routing step of the distributing step comprises finding a first set of disjoint paths from the source node to the respective ones of the N intermediate routing nodes, and wherein a subsequent routing step of the distributing step comprises finding a second set of disjoint paths from each of the respective ones of the N intermediate routing nodes to the at least one destination node.

17. The article of claim 16, wherein the distributing step further comprises the step of determining one or more disjoint paths from the source node to at least a portion of the N intermediate routing nodes.

18. The article of claim 16, wherein the distributing step further comprises the step of determining one or more disjoint paths from at least a portion of the N intermediate routing nodes to the at least one destination node.

19. An article of manufacture storing one or more programs for use in processing a traffic flow in a communication network comprising a plurality of nodes, the traffic flow being deliverable from a source node to at least one destination node via one or more intermediate routing nodes, the one or more programs when executed in a processor implementing a method comprising the steps of:

splitting the traffic flow at the source node into a plurality of N parts; and distributing the N parts to respective ones of N intermediate routing nodes such that the N parts are routed from the source node to the at least one destination node in a disjoint manner such that no two paths between the source node and the at least one destination node have any nodes or links in common to prevent a single link failure or a single node failure from affecting the complete traffic flow between any source-destination node pair;

wherein the distributing step further comprises the step of distributing, at most, two parts of the traffic flow on any given link of the network.

20. An article of manufacture storing one or more programs for use in processing a traffic flow in a communication network comprising a plurality of nodes, the traffic flow being deliverable from a source node to at least one destination node via one or more intermediate nodes, the one or more programs when executed in a processor implementing a method comprising the steps of:

introducing two parity packets for every k−2 packets of traffic at the source node, where k is the total number of packets;

splitting the traffic flow with the parity packets at the source node into a plurality of k parts; and distributing the k parts to respective ones of the intermediate nodes such that the k parts are routed from the source node to the at least one destination node in a disjoint manner where no two paths between the source node and the at least one destination node have any nodes or links in common to prevent a single link failure or a single node failure from affecting the complete traffic flow between any source-destination node pair.

* * * * *